3,404,332
MAGNETIC RESONANCE DEVICES FOR ACCURATELY MEASURING MAGNETIC FIELDS, IN PARTICULAR LOW MAGNETIC FIELDS, ON BOARD OF A MOVABLE BODY
Anatole Abragam, Paris, and Ionel Solomon, Boulogne, France, assignors to Commissariat à l'Energie Atomique, Paris, France, an organization of France
Filed Dec. 9, 1964, Ser. No. 417,061
Claims priority, application France, Dec. 12, 1963, 956,900
5 Claims. (Cl. 324—.5)

ABSTRACT OF THE DISCLOSURE

The magnetometer comprises two magnetic resonance generators linked together side by side, the two active subnuclear particles of said generators having different gyromagnetic ratios, said generators delivering therefore two voltages at two frequencies proportional to the intensity of the magnetic field in which are located the generators, but with different proportionality factors, a frequency converter, e.g. a mixer, receiving said two two voltages and delivering a third voltage at a third frequency equal to the algebraic difference of said two voltages, and a frequency meter measuring the frequency of said third voltage which is proportional to said intensity and independent of the rotations of said generators.

---

Figure 1:
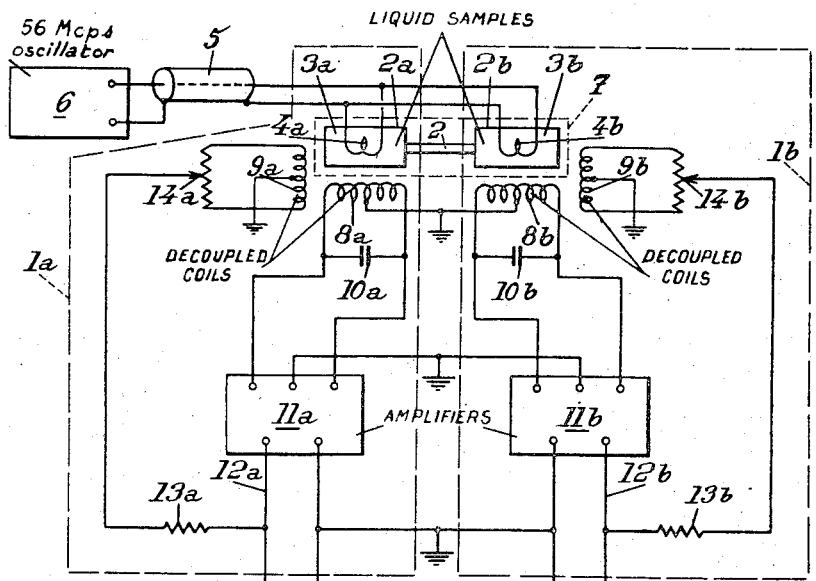

The present invention relates to magnetic resonance devices for measuring the intensity of magnetic fields, in particular of low value magnetic fields (lower than 1 gauss) and their variations, on board of a movable body (aircraft, missile and so on).

At the present time there are different types of known magnetometers based on magnetic resonance, determining the precession frequency, called Larmor frequency, of the magnetic moment, generally the nuclear magnetic moment, of a subatomic particle, generally an atomic nucleus and more particularly a proton, in the magnetic field to be measured, this frequency being proportional to the intensity of the magnetic field in which said subatomic particle is placed.

Designating by H the intensity in gauss of the magnetic field to be measured, in which the subatomic particle is placed, by $\gamma$ the gyromagnetic ratio of the particle (the existence of a well determined $\gamma$ ratio meaning that the angular momentum or spin and therefore also the magnetic moment of the particle are different from zero) and by F the precession or Larmor frequency in cycles per second, there is the relation:

(1)  $2\pi F = \gamma H$

The gyromagnetic ratio $\gamma$, expressed in gauss/sec. is known with a very great precision for many atomic nuclei. In particular the gyromagnetic ratio of the proton in deoxygenated water is known with a precision of one part in one million and is equal to 26751.3 gauss/sec.

The electromagnetic radiation of a frequency equal to F is a circularly polarized, the resonance producing a rotation of the total magnetic moment about the direction of the magnetic field. The electromagnetic radiation rotary field is detected by means of at least one coil, disposed around the subatomic particles, in which coil the rotary field produces an alternating voltage. It follows that, if the coil is located on board of a movable body having an instantaneous angular velocity $\omega$ of rotation about the direction of the magnetic field, the coil is itself driven at this angular velocity and the frequency of the alternating voltage, which is created in said coil by magnetic resonance, will no longer be given by the above Formula 1, which corresponds to the absolute rotation of the total magnetic moment with respect to a stationary reference system, but will correspond to the relative rotation of this moment with respect to a reference system linked to the movable body and therefore to the coil. In other words, according to the law of composition of angular velocities, and calling $f$ the frequency in the case of a rotation at the instantaneous velocity $\omega$, the above formula will be, (2)  $2\pi f = \gamma H - \omega$ If it is desired, in particular, to measure with a high precision a weak magnetic field such as the earth magnetic field, and its variations, with a magnetic resonance magnetometer of the prior type, the measurement is inaccurate, because it is based on Formula 1 and neglects the influence of $\omega$. Now $\omega$ can take values which are relatively important and are very variable when the measurement is made on board of an aircraft, or of another movable body capable of rotating about the axis of the magnetic field. It is very difficult, if not impossible, to make the correction corresponding to $\omega$, due to fact that the value of $\omega$ is very variable, so that very troublesome inaccuracies in the measurement of H and of the variations thereof occur.

Field work concerning magnetism and geophysical researches concerning mineral substances based upon the variations of H is therefore inaccurate if the influence of $\omega$ is neglected. The object of the present invention is to obviate these drawbacks and to permit of measuring the intensity of the magnetic field by means of magnetic resonance, and in particular of nuclear resonance, while eliminating the influence of the rotation, with respect to this field, of the movable vehicle in which the measurement device according to the invention is located.

According to the present invention, for measuring the intensity of the magnetic field, in particular the weak magnetic field (lower than 1 gauss), existing in a given zone on board of a movable vehicle, by detection of the magnetic resonance signals of subatomic particles, in particular of atomic nuclei, having a well determined gyromagnetic ratio: two magnetic resonance signals are produced by two systems of subatomic particles having different gyromagnetic ratios, said systems being located in said zone and stationary with respect to each other, a third signal is derived from these two signals, said third signal having a frequency equal to the algebraic difference of the respective frequencies of the two magnetic resonance signals, these two last mentioned frequencies being given the sign of the gyromagnetic ratio of the corresponding particles, and the frequency of said third signal, (which is proportional to the intensity H of the magnetic field to be measured and independent of the rotation of said systems with respect to this magnetic field) is determined.

The device or magnetometer according to the invention comprises therefore magnetic resonance generators each capable of delivering a voltage, at the Larmor frequency of a subatomic particle, having a well determined gyromagnetic ratio, and a frequency meter, and it is characterized by the fact that it comprises two such magnetic resonance generators with two systems of subatomic particles having different gyromagnetic ratios, respectively, said generators being stationary with respect to each other and delivering two voltages at different frequencies, and means, connected with the outputs of said generators for receiving said two voltages and delivering a third voltage the frequency of which is equal to the algebraic difference of the two first mentioned voltages, said frequency meter being connected with the output of said means for receiving the third voltage and measuring the frequency thereof.

The above mentioned means advantageously consist of a mixer followed by a band-pass filter the passing band of which is centered on said algebraic difference.

The magnetic resonance frequencies $f_1$ and $f_2$ of the two particles corresponding to gyromagnetic ratios $\gamma_1$ and $\gamma_2$, respectively, are given by the following relations $$2\pi f_1 = \gamma_1 H - \omega \quad (3)$$
$$2\pi f_2 = \gamma_2 H - \omega \quad (4)$$

in the case where $\gamma_1$ and $\gamma_2$ are positive, that is to say if the polarizations of the magnetic resonance radiations of two kinds of particles are of the same direction.

If $f_3$ is the difference between $f_1$ and $f_2$, then $$2\pi f_3 = 2\pi f_1 - 2\pi f_2 = (\gamma_1 - \gamma_2)H = GH \quad (5)$$

G being the difference $\gamma_1 - \gamma_2$ and it being supposed that $\gamma_1$ is greater than $\gamma_2$. The values of $\gamma_1$ and $\gamma_2$ being known with a great precision, G is also known with a high precision.

Relation (5) therefore replaces relation (1) with the advantage that the frequency $f_3$ is strictly proportional to H even if the magnetometer is rotating with respect to the direction of H.

In the case where $\gamma_1$ and $\gamma_2$ are not of the same sign, $\gamma_1$ being for instance positive and $\gamma_2$ negative, relation (3) remains true, whereas relations (4) and (5) are replaced by the following relations:

$$2\pi f_2 = \omega - \gamma_2 H \quad (4a)$$
$$2\pi(f_1 + f_2) = (\gamma_1 - \gamma_2)H = GH \quad (5a)$$

G being in all cases the algebraic difference of the two gyromagnetic ratios.

As pairs of subatomic particles suitable for the present invention, the following may be cited:

Protons and fluorine nuclei,
Protons and phosphorus nuclei,
Protons and helium 3 nuclei, All these nuclei have positive gyromagnetic ratios, with the exception of helium, which has a negative gyromagnetic ratio.

For the two first mentioned pairs, the voltage generators at the magnetic resonance frequency advantageously bring into play the method of dynamic polarization by electronic pumping disclosed in the U.S. Patent No. 3,049,661 (Patent No. 1) issued Aug. 14, 1962, to Anatole Abragam, Jean Combrisson, and Ionel Solomon, that is to say comprise in solution, in a solvent containing said nuclei (protons, fluorine nuclei, phosphorus nuclei), a paramagnetic radical with an unpaired electron, saturation of an electronic resonance line increasing by electronic pumping the intensity of the nuclear signal. On the contrary, when use is made of the pair consisting of protons and helium 3 nuclei, the generator corresponding to the helium 3 nuclei is of the optical (and not electronic) pumping type.

Figure 2:
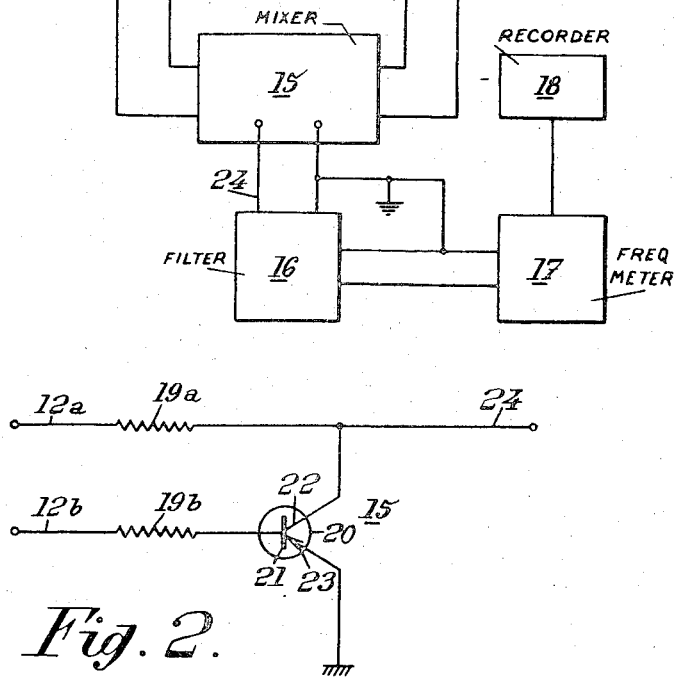

Preferred embodiments of the present invention will be hereinafter described with reference to the appended drawings, given merely by way of example, and in which:

FIG. 1 shows an embodiment of a magnetometer according to the present invention; and FIG. 2 shows an embodiment of the mixer included in the magnetometer of FIG. 1.

The magnetometer illustrated by FIG. 1 comprises two magnetic resonance generators capable of producing two voltages of respective frequencies $f_1$ and $f_2$ equal to the respective Larmor frequencies for two subatomic particles, in particular two atomic nuclei, having different respective gyromagnetic ratios $\gamma_1$ and $\gamma_2$, these magnetic resonance generators being for instance of the type described in the Belgium Patent No. 641,458 (Patent No. 2)—to which corresponds U.S. Patent No. 3,249,856 patented May 3, 1966—with reference to FIG. 4 of these patents (of the spin oscillator type).

In this case, each of the magnetic resonance generators $1a$, $1b$ comprises a vessel $2a$, $2b$, containing a solution $3a$, $3b$ which contains, on the one hand, a solvent with atomic nuclei having a magnetic moment and an angular momentum both different from zero and consequently having each a well determined gyromagnetic ratio, and, on the other hand, dissolved in this solvent, a paramagnetic free radical having a relatively large energy level splitting (that is to say a material resonance frequency in a zero magnetic field) and a dipolar coupling between the spins of the unpaired electrons of the free radical and the spins of the atomic nuclei of the solvent, saturation of an electronic resonance line of such a radical increasing, due to the Overhauser-Abragam effect, the intensity of the signal, at the Larmor frequency, of the atomic nuclei. Said nuclei preferably have a very low quadripolar moment.

By way of example, vessel $2a$ contains a solution $3a$ of 200 cm.³ of water containing, in solution therein, 0.5 g. of peroxylamine sulfate $(SO_3)_2NOK_2$, the resonance frequency of which in a zero field averages 56 mHz., whereas vessel $2b$ contains a solution $3b$ of 200 cm.³ of $C_6H_4(CF_3)_2$, in the meta form saturated with peroxylamine sulfate.

Both of the vessels $2a$ and $2b$ are rigidly secured with respect to each other by means of a rigid member 2 and the electronic resonance line at 56 mHz. of the peroxylamine sulfate contained in each of the vessels is saturated by means of a coil $4a$, $4b$ disposed in said vessel and fed with current through a coaxial cable 5 from a generator or high frequency oscillator 6 delivering a sinusoidal voltage at a frequency equal to 56 mHz., the power absorbed by the oscillator being for instance, of the order of 1 watt.

Due to the saturation of the electronic resonance line at 56 mHz. of the peroxylamine sulfate, the magnetic resonance signal of the protons of solution $3a$, on the one hand, and of the fluorine nuclei of solution $3b$, on the other hand, in the magnetic field H existing in the zone 7 occupied by vessels $2a$ and $2b$, has an increased intensity due to the Overhauser-Abragam effect.

The Larmor frequency signal in each vessel $2a$, $2b$ is detected by means of a device of the spin oscillator type described in the above mentioned Patent No. 2 with reference to FIG. 4 thereof.

Each of these devices comprises two coils $8a$, $8b$ and $9a$, $9b$ which surround the vessel and may comprise for instance 6000 and 200 turns respectively. Between the external coils $8a$, $8b$ and $9a$, $9b$, on the one hand, and the internal coils $4a$, $4b$, on the other hand, there is provided an electric screen (not shown), of a known type, practically opaque to the electronic radiation at 56 mHz. but, through which passes the magnetic resonance radiation at frequency $$f_1 = \frac{\gamma_1}{2} \cdot H \text{ and } f_2 = \frac{\gamma_2}{2} \cdot H$$

respectively.

It is only for the sake of clarity in the drawing that coils $8a$, $8b$ and $9a$, $9b$ are shown at a distance from vessels $2a$, $2b$.

Between the terminals of each of the coils $8a$ and $8b$ there is mounted a capacitor $10a$, $10b$, the whole of $8a$ and $10a$, on the one hand, and $8b$ and $10b$, on the other hand, constituting a resonant circuit tuned at the Larmor frequency $f_1$ and $f_2$, respectively.

Each coil $8a$, $8b$ is connected to a linear amplifier $11a$, $11b$ without phase distortion, this amplifier being preferably a selective amplifier having a narrow band-pass centered on $f_1$ or $f_2$ respectively. In this case, selectivity of the resonant circuit (the Q factor of which may have an order of magnitude of 4 or 5 so as to reduce "pulling") and of the amplifier eliminates most of the ground noise and consequently increases the signal to noise ratio.

Amplifier $11a$, $11b$, which may have a gain of the order of 70 decibels, has its output connected, through a resistor $13a$, $13b$ of the order of 110,000 ohms, to coil $9a$, $9b$. The middle points of coils $8a$, $8b$ and $9a$ and $9b$ and of the amplifier $11a$, $11b$ of each channel are grounded.

The axes of coils $8a$, $8b$ and $9a$, $9b$ are perpendicular to each other, in such manner as to realize an electric decoupling between each pair of coils 8a–9a and 8b–9b. The residual coupling is reduced to a minimum by means of a balancing potentiometer 14a, 14b of 25,000 ohms. In these conditions of decoupling, only the nuclear resonance phenomon can couple coils 8a–9a, on the one hand, and 8b–9b, on the other hand. When there is in coil 8a–8b a nuclear induction alternating electromotive force at the Larmor frequency corresponding to magnetic field H and the gyromagnetic ratio $\gamma_1$ or $\gamma_2$ respectively, this electromotive force is amplified by amplifier 11a, 11b, then applied to coil 9a, 9b the magnetic field of which ensures the permanency of this electromotive force which maintains the oscillations. It may be said that system 8a–11a–9a together with vessel 2a, on the one hand, and 8b–11b–9b together with vessel 2b, on the other hand, constitute a quantic oscillator corresponding to a conventional reaction oscillator in which the nuclear resonance curve plays the same part as the curve of the oscillatory circuit in conventional oscillators. As the coupling takes place at the Larmor frequency the oscillator oscillates at this frequency.

To sum up, if it were supposed that H is equal to zero, low current would pass through amplifier 11a, 11b due to the decoupling between coils 8a–9a, 8b–9b. On the contrary when H is different from zero, the magnetic moments of the hydrogen nuclei of solution 3a and of the fluorine nuclei of solution 3b undergo a precession at the Larmor frequency and each generator or nuclear oscillator 1a, 1b, in particular each amplifier 11a, 11b delivers a voltage at a frequency equal to said Larmor frequency, that is to say $f_1$ for 11a and $f_2$ for 11b.

Complementary details concerning the arrangement and the operation of each of the spin oscillators are given in the above mentioned Patent No. 2.

A mixer 15 receives the voltages of frequencies $f_1$ and $f_2$, delivered on outputs 12a and 12b, and it delivers on its output 24 a signal having the frequencies $f_1$, $f_2$, $f_1+f_2$, and $f_1-f_2$. A band-pass filter 16 passes only the frequency $f_1-f_2$ (when $\gamma_1$ and $\gamma_2$ are both positive as in the chosen example) or $f_1+f_2$ (when $\gamma_1$ and $\gamma_2$ are of opposed signs) on which the band-pass is centered.

According to Formula 5 (or 5a if $\gamma_1$ and $\gamma_2$ are of opposed signals), the frequency $f_3$ of the voltage issuing from filter 16 is strictly proportional to the intensity H of the magnetic field to be measured in zone 7 and independent of $\omega$.

Frequency $f_3$ is measured by means of a frequency meter 17 of a known type and the value of this frequency may be recorded by means of a recorder 18.

In the example that has been chosen and in the case where the measurement is concerned with the intensity H (of the order of 0.5 gauss) of the earth magnetic field, the values are as follows: $f_1=2100$ Hz., $f_2=1975$ Hz., and $f_3=125$ Hz.

In a modification of the embodiment illustrated by FIG. 1, vessel 2a might contain a solution of peroxylamine sulfate saturated with sodium metaphosphate, the second particle being, in this case, phosphorus. Only the tuning frequencies $f_2$ and $f_3$ are different.

FIG. 2 illustrates an embodiment of mixer 15.

The voltages of respective frequencies $f_1$ and $f_2$ delivered on the outputs 12a and 12b of amplifiers 11a and 11b are fed respectively to resistors 19a, 19b, respectively of 10 kilohms and 33 kilohms. The mixer proper consists of a transistor 20, for instance a silicon transistor of the pnp type, such as a BEZ11 transistor, the base 21 of which receives the electromotive force at frequency $f_2$ across resistor 19b and the collector 22 of which receives frequency $f_1$ across resistor 19a, whereas emitter 23 is grounded. The output is available on conductor 24 connected to collector 22. A strong component at $f_1-f_2$ is obtained on this conductor 24. In a modification, 12a and 24 may be connected to the emitter, the collector being grounded.

FIG. 1 shows the two vessels 2a and 2b ganged or linked together by an element 2. Of course these two vessels might be in direct contact with each other. It would also be possible to place the two systems of particles (protons and phosphorus nuclei or protons and fluorine nuclei) the resonance of which is detected in a single vessel with which the two pairs of coils 8a–9a and 8b–9b would be simultaneously coupled.

Although the invention has been shown in the case where use is made of two spin oscillators of the type described in FIG. 4 of the above mentioned Patent No. 2, in particular with proton systems on the one hand and phosphorus or fluorine nuclei systems on the other hand, the invention may also be carried out, using these systems of particles with other types of magnetic resonance generators, for instance with generators of the maser type described in Patent No. 2, or with free precession (called also induction) generators also described in Patent No. 2, both of these types of generators advantageously bringing into play the Overhauser-Abragam effect.

On the other hand a solution of peroxylamine sulfate has been indicated as example of a free radical paramagnetic solution (that is to say with an unpaired electron) used in vessels 2a and 2b. Instead of such a solution, it would be possible to use solutions of diphenylpicrylhydrazyl or of a free radical comprising a nitroxide group the nitrogen atom of which is on the other hand linked exclusively with two carbon atoms, each linked with three other carbon atoms, in particular one of the free radicals cited in Patent No. 2. Of course the frequency of saturation of the electronic resonance line, which is 56 mHz. in the case of the peroxylamine sulfate varies with the paramagnetic free radical that is used.

Finally, in the case where one of the subatomic particle systems consist of a helium 3 nuclei system, the Larmor frequency generator corresponding to these nuclei advantageously consists of an optical pumping generator of the type described by L. D. Schearer in "Advances in Quantum Electronics," pages 239 to 251 (editor J. R. Singer—Columbia University Press, New York and London, 1961).

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What we claim is:

1. A device for measuring the intensity of the magnetic field, especially the very low earth magnetic field, from aboard a movable vehicle as a plane, comprising, in combination, a first magnetic resonance generator including a first system of subatomic particles having a first gyromagnetic ratio and delivering therefor at its output a first voltage at a frequency proportional to the product of said first gyromagnetic ratio and the intensity of the magnetic field in which it is located, a second magnetic resonance generator disposed adjacent to said first generator, said second generator including a second system of subatomic particles having a second gyromagnetic ratio, different from said first gyromagnetic ratio, and delivering therefore at its output a second voltage at a frequency proportional to the product of said second gyromagnetic ratio and the intensity of the magnetic field in which it is located with said first generator, frequency conversion means with a first and a second input and one output, said first input being connected to the output of said first generator, said second input being connected to the output of said second generator, said means delivering at its output a third voltage at a frequency equal to the algebraic difference of the frequencies of said two first voltages, taking into account the sign of the gyromagnetic ratio of the system delivering each voltage and a frequency meter connected to the output of said means for determining the frequency of said third voltage which is proportional to the intensity of the magnetic field in which said first and second generators are located, and independent of the rotation of said generators in said field.

2. A device according to claim 1, wherein at least one of said generators comprises a container containing said system of subnuclear particles, a first coil surrounding said container for picking up the voltage generated by magnetic resonance at a frequency proportional to the gyromagnetic ratio of said system and the intensity of the magnetic field, a second coil located with its axis perpendicular to the axis of said first coil, said first and second coils being electrically decoupled in the absence of magnetic resonance, a capacitor connected across said first coil and a linear amplifier having an input connected across the terminals of said first coil and an output connected across the terminals of said second coil and constituting the output of the generator.

3. A device according to claim 2, wherein said capacitor and said first coil constitute a resonant circuit tuned on said frequency and said amplifier is a narrow band amplifier tuned on said frequency.

4. A device according to claim 1, wherein said frequency conversion means comprise a mixer, with a first and a second input constituting the first and second inputs of said means respectively and an output, and a band pass filter tunable on the expected mean value of the frequency of said third voltage, said filter having an input connected to the output of said mixer and an output constituting the output of said means.

5. A device according to claim 4 wherein said mixer is constituted by a transistor with a base and two other electrodes, a first resistor having a first terminal connected to said base and a second terminal constituting said first input of said mixer, and a second resistor having a first terminal connected to one of said two other electrodes and constituting said output of said mixer and a second terminal constituting said second input of said mixer.

References Cited
UNITED STATES PATENTS

| | | | |
|---|---|---|---|
| 2,916,690 | 12/1959 | Leete | 324—.5 |
| 2,929,018 | 3/1960 | Varian | 324—.5 |
| 2,996,657 | 8/1961 | Varian | 324—.5 |
| 3,274,488 | 9/1966 | Washkurak | 324—.5 |

RUDOLPH V. ROLINEC, *Primary Examiner.*

M. J. LYNCH, *Assistant Examiner.*